US012650336B2

(12) United States Patent
Hyeon

(10) Patent No.: US 12,650,336 B2
(45) Date of Patent: Jun. 9, 2026

(54) DISPLAY APPARATUS, INSPECTION APPARATUS FOR THE DISPLAY APPARATUS, AND CONTROL METHOD OF THE INSPECTION APPARATUS

(71) Applicant: SAMSUNG ELECTRONICS CO., LTD., Suwon-si (KR)

(72) Inventor: Byeongcheol Hyeon, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/944,969

(22) Filed: Nov. 12, 2024

(65) Prior Publication Data

US 2025/0216249 A1     Jul. 3, 2025

Related U.S. Application Data

(63) Continuation of application No. PCT/KR2024/016659, filed on Oct. 29, 2024.

(30) Foreign Application Priority Data

Dec. 28, 2023     (KR) ........................ 10-2023-0195410

(51) Int. Cl.
*G09G 5/10*          (2006.01)
*G01J 1/42*          (2006.01)
          (Continued)

(52) U.S. Cl.
CPC ................ *G01J 1/42* (2013.01); *G06T 7/001* (2013.01); *G09G 3/32* (2013.01);
          (Continued)

(58) Field of Classification Search
CPC ..... G01J 1/42; G01J 2001/4252; G06T 7/001; G06T 2207/30108; G09G 3/32; G09G 2320/0233; G09G 2330/10
          (Continued)

(56) References Cited

U.S. PATENT DOCUMENTS 9,159,258 B2    10/2015  Lee
9,858,886 B2     1/2018  Bae et al.
          (Continued)

FOREIGN PATENT DOCUMENTS

CN          114708834 B       2/2023
KR    10 2014 0086619 A       7/2014
          (Continued)

OTHER PUBLICATIONS

International Search Report and Written Opinion dated Feb. 24, 2025, issued by the International Searching Authority in International Application No. PCT/KR2024/016659 (PCT/ISA/210 and PCT/ISA/237).

*Primary Examiner* — Jennifer T Nguyen
(74) *Attorney, Agent, or Firm* — Sughrue Mion, PLLC

(57)          ABSTRACT

An inspection apparatus includes: a memory; an image sensor configured to obtain a luminance image of the display apparatus comprising a plurality of pixels; and a processor configured to recognize a defective pixel based on the obtained luminance image, configured to recognize location information of the recognized defective pixel, and configured to control the memory to store the recognized location information of the defective pixel.

15 Claims, 13 Drawing Sheets

(51) Int. Cl.
    *G06T 7/00*              (2017.01)
    *G09G 3/32*              (2016.01)

(52) U.S. Cl.
    CPC ................. *G01J 2001/4252* (2013.01); *G06T 2207/30108* (2013.01); *G09G 2320/0233* (2013.01); *G09G 2330/10* (2013.01)

(58) Field of Classification Search
    USPC ........................................................ 345/690
    See application file for complete search history.

(56)                     References Cited

U.S. PATENT DOCUMENTS

| | | |
|---|---|---|
| 10,741,114 B2 | 8/2020 | Park |
| 11,308,892 B2 | 4/2022 | Cho et al. |
| 11,481,175 B2 | 10/2022 | Oh et al. |

| | | | |
|---|---|---|---|
| 2011/0227958 A1* | 9/2011 | Park | G09G 3/20 |
| | | | 345/88 |
| 2015/0154933 A1* | 6/2015 | Bae | G09G 3/3611 |
| | | | 345/618 |
| 2022/0101790 A1* | 3/2022 | Wetherell | G09G 3/3233 |

FOREIGN PATENT DOCUMENTS

| | | |
|---|---|---|
| KR | 10 2015 0064469 A | 6/2015 |
| KR | 10-1705063 B1 | 2/2017 |
| KR | 10 1988490 B1 | 6/2019 |
| KR | 10-2019-0078780 A | 7/2019 |
| KR | 10-2019-0079141 A | 7/2019 |
| KR | 10-2009740 B1 | 8/2019 |
| KR | 10-2021-0069234 A | 6/2021 |
| KR | 10 2381120 B1 | 4/2022 |
| KR | 10-2435096 B1 | 8/2022 |
| KR | 10-2510121 B1 | 3/2023 |
| KR | 10 2543039 B1 | 6/2023 |
| KR | 10-2565690 B1 | 8/2023 |

* cited by examiner

FIG. 4

| 100a | | | 100b | | | 100c | | |
|---|---|---|---|---|---|---|---|---|
| sp1 | sp2 | sp3 | sp1 | sp2 | sp3 | sp1 | sp2 | sp3 |

| (x1, y1) : a1 | (x2, y1) : a2 | (x3, y1) : a3 | (x4, y1) : a4 | (x5, y1) : a5 | ... |
|---|---|---|---|---|---|
| (x1, y2) : a6=0 | (x2, y2) : a7 | (x3, y2) : a8 | (x4, y2) : a9 | (x5, y2) : a10 | ... |
| (x1, y3) : a11 | (x2, y3) : a12 | (x3, y3) : a13 | (x4, y3) : a14 | (x5, y3) : a15 | ... |
| (x1, y4) : a16 | (x2, y4) : a17 | (x3, y4) : a18=0 | (x4, y4) : a19 | (x5, y4) : a20 | ... |
| (x1, y5) : a21 | (x2, y5) : a22 | (x3, y5) : a23 | (x4, y5) : a24 | (x5, y5) : a25 | ... |
| ... | ... | ... | ... | ... | ... |

DISPLAY APPARATUS, INSPECTION APPARATUS FOR THE DISPLAY APPARATUS, AND CONTROL METHOD OF THE INSPECTION APPARATUS

CROSS-REFERENCE TO RELATED APPLICATION

This application is by-pass continuation application of International Application No. PCT/KR2024/016659, filed on Oct. 29, 2024, which based on and claims priority to Korean Patent Application No. 10-2023-0195410, filed on Dec. 28, 2023, in the Korean Intellectual Property Office, the disclosures of which are incorporated by reference herein in their entireties.

BACKGROUND

1. Field

The present disclosure relates to an inspection apparatus configured to inspect whether pixels of a display panel are defective and a control method thereof, and to a display apparatus configured to perform luminance correction for a defective pixel.

2. Description of Related Art

With the development of electronic technology, various types of electronic products have been developed and distributed. As use of electronic devices increases, user needs for various display apparatus have also increased.

Display apparatuses that are widely used include a liquid crystal display (LCD) based display apparatus, an organic light emitting diode (OLED)-based display apparatus, a mini-LED-based display apparatus, and a micro-LED-based display apparatus.

The mini-LED-based display apparatus or the micro-LED-based display apparatus are attracting attention as next-generation display apparatus due to advantages in high contrast ratio, response speed, color reproducibility, viewing angle, brightness, and lifespan.

As for the LED-based display apparatus, when one sub-pixel is electrically open and defective, the defective sub-pixel does not light up when the defective sub-pixel should light up, and normal sub-pixels that are circuit-connected to the defective sub-pixel incorrectly light up (e.g., the normal sub-pixels light up when the normal sub-pixels should not light up).

SUMMARY

There is provided a display apparatus including: a display panel comprising a plurality of pixels; a memory storing location information of a defective pixel among the plurality of pixels; and a processor configured to limit an electrical signal transmitted to the defective pixel based on the location information, stored in the memory, of the defective pixel.

The memory may store normal location information and normal luminance correction information for each of normal pixels, other than the defective pixel, among the plurality of pixels, and the processor may be further configured to obtain the normal luminance information for each of the normal pixels based on image information, may be further configured to correct the obtained normal luminance information for each of the normal pixels based on the normal location information and the normal luminance correction information for each of the normal pixels, may be further configured to generate an electric signal for each of the normal pixels based on the corrected normal luminance information for each of the normal pixels, and may be further configured to transmit the generated electric signal to each of the normal pixels, and the normal luminance correction information for each of the normal pixels may include information corresponding to a difference between an average value of luminance values of the plurality of pixels and a luminance value for each of the normal pixels.

The memory may include a removable non-volatile memory and stores a value less than a minimum value among the luminance values of the plurality of pixels, as luminance correction information of the defective pixel, and the processor may be further configured to limit an electric signal transmitted to the defective pixel based on the luminance correction information of the defective pixel.

The memory may store the luminance correction information of the defective pixel as 0 (zero), and the processor may be further configured to limit an electric signal transmitted to the defective pixel to 0 (zero), based on the luminance correction information of the defective pixel.

The display apparatus may include a communication circuitry configured to communicate with a server, and the processor may be further configured to receive the location information of the defective pixel as inspected by an inspection apparatus and through the communication circuitry.

The processor may be further configured to detect a voltage value applied to each of the plurality of pixels, may be further configured to recognize a value less than or equal to a reference voltage value from the voltage value for each of the plurality of pixels, and may be further configured to recognize a pixel, to which the recognized value is applied, as the defective pixel.

The display panel may include a self-luminous light emitting diode (LED) display panel, and wherein the defective pixel may include a pixel that is open in terms of an electrical circuit.

There is provided an inspection apparatus including: a memory; an image sensor configured to obtain a luminance image of a display apparatus, the display apparatus comprising a plurality of pixels; and a processor configured to recognize a defective pixel, from the plurality of pixels, based on the obtained luminance image, wherein the processor is further configured to recognize location information of the recognized defective pixel, and is further configured to control the memory to store the recognized location information of the defective pixel, and the memory is removably connected to at least one of the display apparatus and the processor, and wherein the location information, stored in the memory and of the defective pixel, comprises information indicating to limit an electric signal applied to the defective pixel of the display apparatus.

The processor may be further configured to obtain luminance values, of each of the plurality of pixels, based on the obtained luminance image, may be further configured to recognize a luminance value, of the luminance values, as less than or equal to a reference luminance value among the obtained luminance value of each pixel, and may be further configured to recognize a pixel, of the plurality of pixels, having the recognized luminance value as a defective pixel; and the processor may be further configured to recognize another pixel, of the plurality of pixels, having a normal luminance value greater than the reference luminance value among the obtained luminance values of each of the plurality of pixels, as a normal pixel, may be further configured to obtain an average value of the luminance values of each of the plurality of pixels, may be further configured to obtain luminance correction information for each of normal pixels, of the plurality of pixels, based on the obtained luminance values of normal pixels, including the normal pixel, and the obtained average value, and may be further configured to control the memory to store the obtained luminance correction information for each of the normal pixels and the location information for each of the normal pixels.

The processor may be further configured to store a luminance correction value of the recognized defective pixel as 0 (zero) in the memory.

The inspection apparatus may include a communication circuitry configured to communicate with the display apparatus, and the processor may be further configured to transmit the location information of the recognized defective pixel to the display panel through the communication circuitry.

The inspection apparatus may include a display portion, and the processor may be further configured to recognize a number of defective pixels, including the defective pixel and of the plurality of pixels, and is further configured to control the display portion to, based on the recognized number of defective pixels being greater than or equal to a reference number, display the recognized number of defective pixels and location information of the defective pixel.

There is provided a control method of an inspection apparatus, the control method including: obtaining a luminance image of a display panel including a plurality of pixels; obtaining luminance values for each of the plurality of pixels based on the obtained luminance image; recognizing a luminance value, of the luminance values, as less than or equal to a reference luminance value among the obtained luminance values for each of the plurality of pixels; recognizing a pixel, of the plurality of pixels, having the recognized luminance value as a defective pixel; recognizing location information of the recognized defective pixel; and storing the recognized location information of the defective pixel in a memory.

The control method may include recognizing a pixel, of the plurality of pixels, having a luminance value, of the luminance values, greater than the reference luminance value among the obtained luminance values for each pixel, as a normal pixel; obtaining an average value of the luminance values of the plurality of pixels; obtaining luminance correction information for each of normal pixels, including the normal pixel and of the plurality of pixels, based on the obtained luminance values and the obtained average value; storing the obtained luminance correction information for each of the normal pixels and the location information for each of the normal pixels in the memory; and storing a luminance correction value of the recognized defective pixel as a limit value in a removable memory.

The control method may include transmitting location information of the recognized defective pixel to a display apparatus through a communication circuitry; recognizing a number of recognized defective pixels; and displaying the recognized number of defective pixels and location information of the defective pixel through a display portion and based on the recognized number of defective pixels being greater than or equal to a reference number.

By recognizing a defective pixel of a display panel using an image sensor during mass production of a display apparatus, it is possible to easily and quickly recognize the defective pixel and accurately recognize a position of the defective pixel.

Further, it is possible to inspect pixels of a display panel in units of display modules and to determine whether to replace each display module based on the number of defective pixels in each display module. Accordingly, it is possible to prevent the disposal of the entire display panel due to a defect in at least one display module, and thus it is possible to reduce waste in manufacturing costs of the display panel.

Further, it is possible to control an electric signal applied to a defective pixel based on location information of the defective pixel of a mass-produced display apparatus, thereby preventing normal pixels connected to the defective pixel in a circuit from lighting up incorrectly, thereby improving a picture quality of a display panel.

Further, it is possible to improve marketability of a display apparatus, further increase user satisfaction, improve user reliability, and secure product competitiveness.

BRIEF DESCRIPTION OF THE DRAWINGS

Further features, nature, and various advantages of the disclosed subject matter will be more apparent from the following detailed description and the accompanying drawings in which:

FIG. 4 is a view illustrating arrangement of light-emitting elements provided in a display module according to one or more embodiments;

FIG. 8 is a table of a memory of the inspection apparatus according to one or more embodiments;

FIG. 9 is a control diagram of the display apparatus according to one or more embodiments;

DETAILED DESCRIPTION

Figure 1:
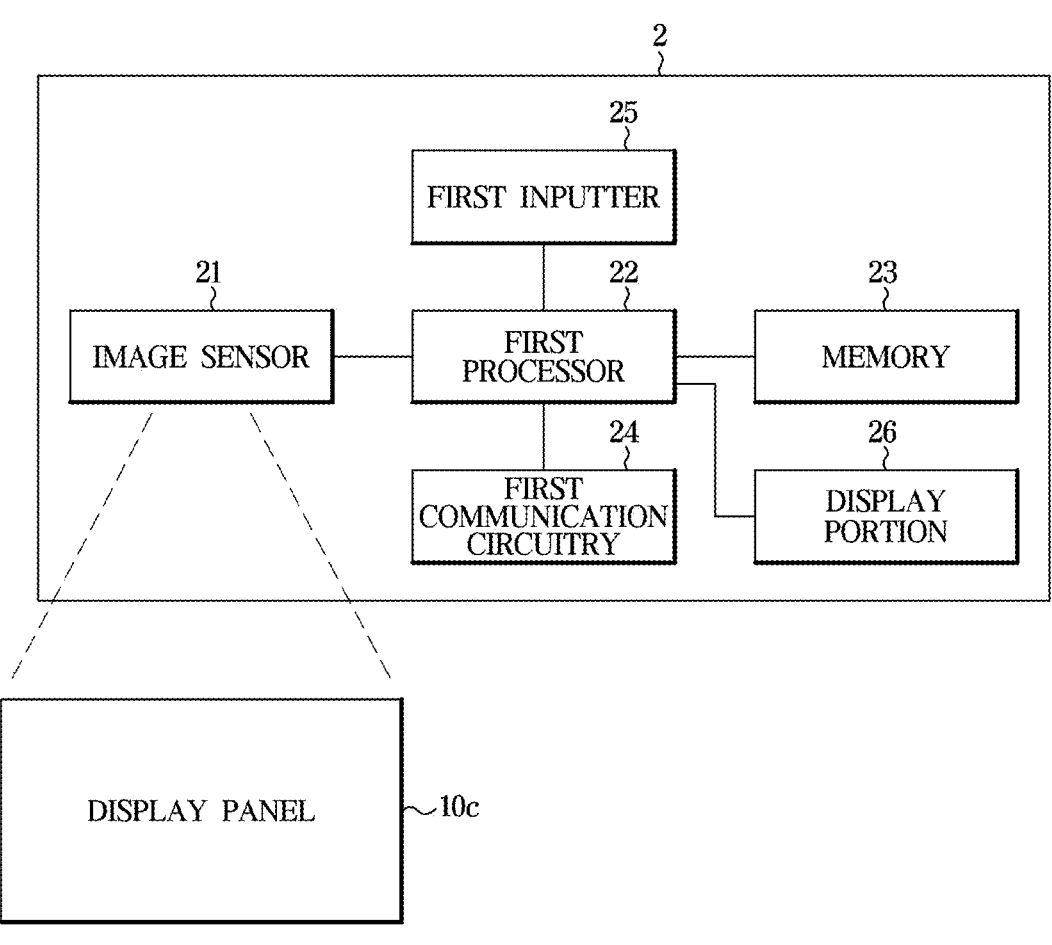
FIG. 1 is a schematic view of an inspection system including a display apparatus and an inspection apparatus for inspecting the display apparatus according to one or more embodiments.

The various embodiments and the terms used therein are not intended to limit the technology disclosed herein to specific forms, and the disclosure should be understood to include various modifications, equivalents, and/or alternatives to the corresponding embodiments.

In describing the drawings, similar reference numerals may be used to designate similar constituent elements.

A singular expression may include a plural expression unless otherwise indicated herein or clearly contradicted by context.

The expressions "A or B," "at least one of A or/and B," or "one or more of A or/and B," A, B or C," "at least one of A, B or/and C," or "one or more of A, B or/and C," and the like used herein may include any and all combinations of one or more of the associated listed items.

Herein, the expressions "a first", "a second", "the first", "the second", etc., may simply be used to distinguish an element from other elements, but is not limited to another aspect (importance or order) of elements.

When an element (e.g., a first element) is referred to as being "(functionally or communicatively) coupled," or "connected" to another element (e.g., a second element), the first element may be connected to the second element, directly (e.g., wired), wirelessly, or through a third element.

In this disclosure, the terms "including", "having", and the like are used to specify features, numbers, steps, operations, elements, components, or combinations thereof, but do not preclude the presence or addition of one or more of the features, figures, steps, operations, elements, components, or combinations thereof.

When an element is said to be "connected", "coupled", "supported" or "contacted" with another element, this includes not only when elements are directly connected, coupled, supported or contacted, but also when elements are indirectly connected, coupled, supported or contacted through a third element.

Throughout the description, when an element is "on" another element, this includes not only when the element is in contact with the other element, but also when there is another element between the two elements.

The term of "and/or" includes a plurality of combinations of relevant elements or any one element among a plurality of relevant elements.

Hereinafter exemplary embodiments of the present disclosure will be described in detail with reference to the accompanying drawings.

FIG. 1 is a schematic view of an inspection system including a display apparatus and an inspection apparatus for inspecting the display apparatus according to one embodiment.

Before describing the inspection apparatus of the inspection system, a configuration of the display apparatus on which inspection is performed by the inspection apparatus will first be described with reference to FIG. 2, FIG. 3, FIG. 4, FIG. 5, and FIG. 6.

Figure 2:
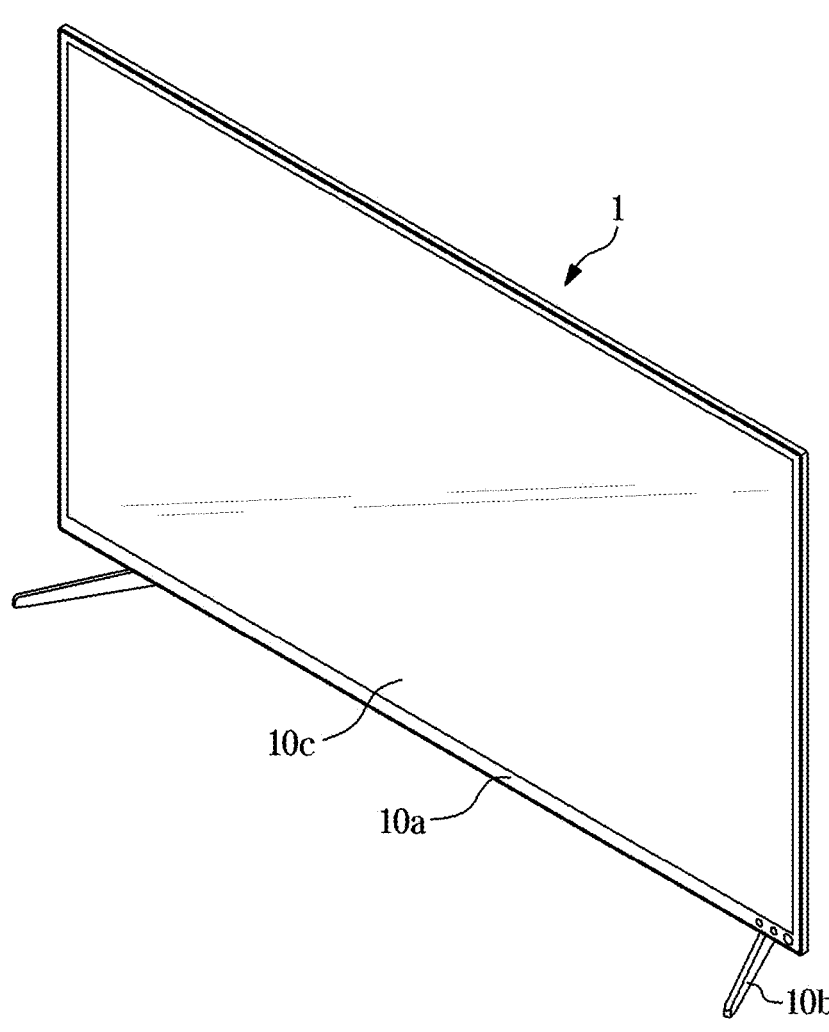
FIG. 2 is a view illustrating the display apparatus according to one or more embodiments.
Figure 3:
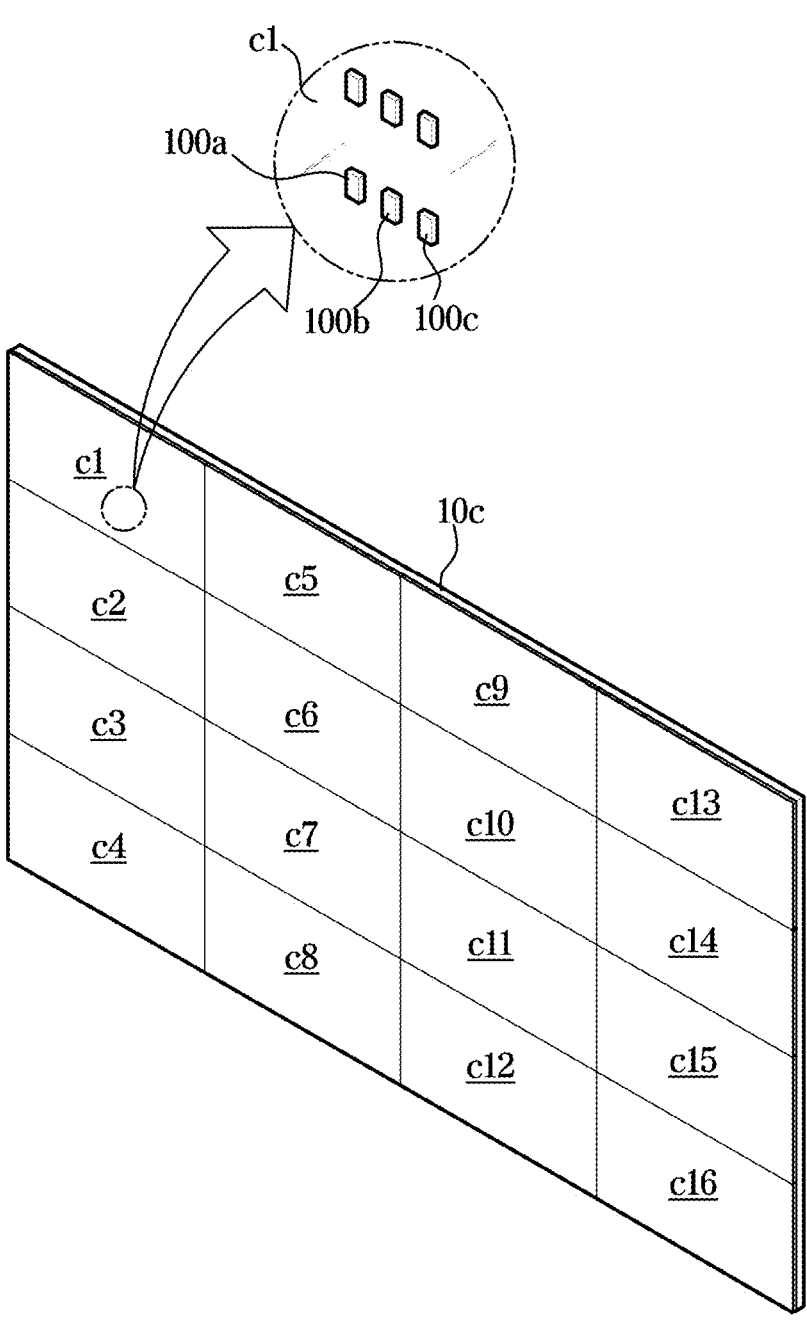
FIG. 3 is a view illustrating a display panel provided in the display apparatus according to one or more embodiments.
Figure 4:
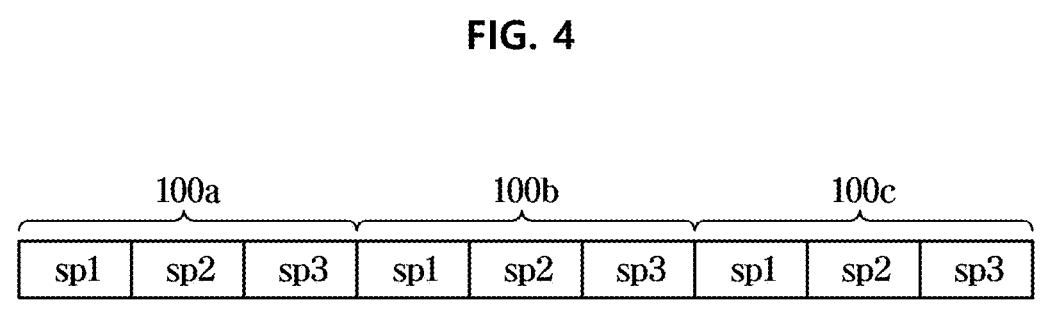
Figure 5:
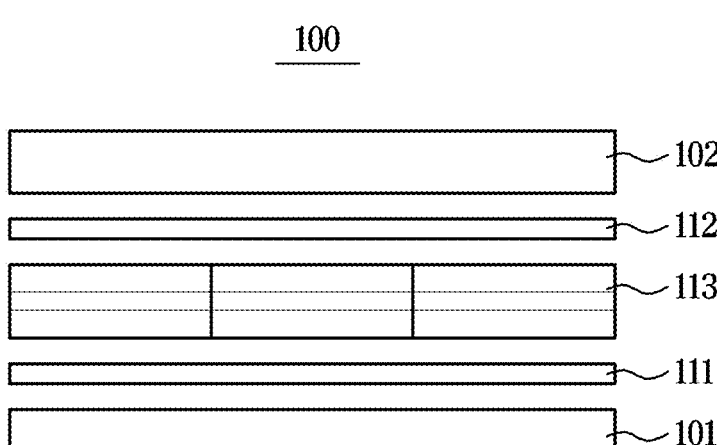
FIG. 5 is a view illustrating a structure of the light-emitting element provided in the display module according to one or more embodiments.
Figure 6:
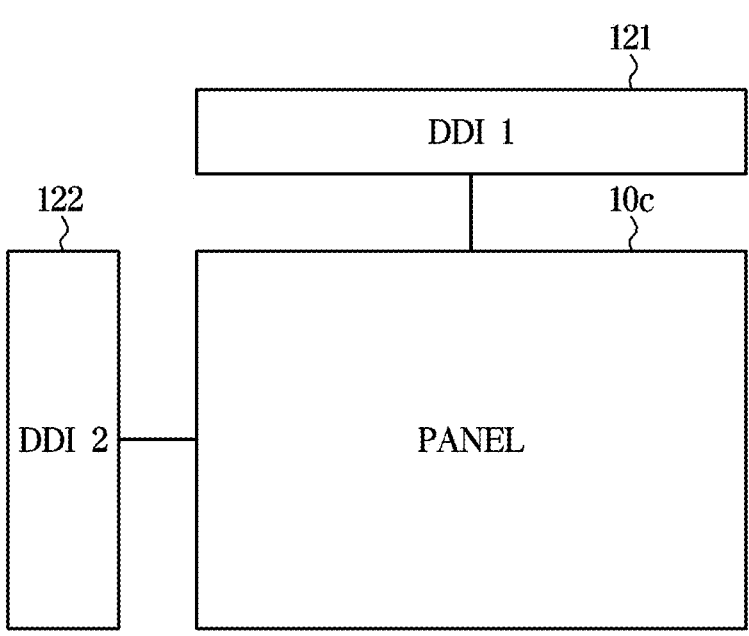
FIG. 6 is a view illustrating a display driver of the display apparatus according to one or more embodiments.

FIG. 2 is a view illustrating the display apparatus according to one or more embodiments, FIG. 3 is a view illustrating a display panel provided in the display apparatus according to one or more embodiments, FIG. 4 is a view illustrating arrangement of light-emitting elements provided in a display module according to one or more embodiments, FIG. 5 is a view illustrating a structure of the light-emitting element provided in the display module according to one or more embodiments, and FIG. 6 is a view illustrating a display driver of the display apparatus according to one or more embodiments.

A display apparatus may include a self-luminous display apparatus and may include a light emitting diode (LED) display apparatus.

The LED display apparatus may include a mini-LED display apparatus and a micro-LED display apparatus.

The micro-LED display apparatus is a display apparatus that uses ultra-small LEDs that are approximately ¹⁄₁₀ the size of the mini-LED display, and may be composed of an LED array of micro-pixels that form individual pixels.

The micro-LED display apparatus may be formed by combining a plurality of display modules. This will be described later with reference to FIG. 3 and FIG. 4.

In the embodiment, the micro-LED display apparatus is described as an example of the display apparatus.

The display apparatus 1 is a device that displays visual and three-dimensional image information, such as a display unit of a mobile device such as a laptop, a smart phone, a tablet, etc., a monitor of a PC, a television, a display unit of a home appliance, a display unit in a vehicle, etc.

As illustrated in FIG. 2, when the display apparatus 1 is a television, the display apparatus 1 includes a main body 10a forming an appearance, and a stand 10b mounted on a lower portion of the main body 10a.

The display apparatus 1 may also be installed on a wall using a bracket or the like without a stand.

The display apparatus 1 may include a display panel 10c provided on the main body 10a and displaying an image.

The main body 10a may include a cover covering a rear surface of the display panel 10c.

The main body 10a may further include a bezel that covers an edge of the display panel 10c. In this case, the cover and bezel of the main body may be detachably coupled to each other.

As illustrated in FIG. 3, the display panel 10c may include a plurality of display modules, display module c1, display module c2, display module c3, display module c4, display module c5, display module c6, display module c7, display module c8, display module c9, display module c10, display module c11, display module c12, display module c13, display module c14, display module c15, and display module c16.

Display module c1, display module c2, display module c5 and display module c6 may form a first cabinet, display module c3, display module c4, display module c7 and display module c8 may form a second cabinet, display module c9, display module c10, display module c13, and display module c14 may form a third cabinet, and display module c11, display module c12, display module c15 and display module c16 may form a fourth cabinet.

The display panel 10c may include a plurality of cabinets, and each cabinet may include a plurality of display modules.

The plurality of display modules, display module c1, display module c2, display module c3, display module c4, display module c5, display module c6, display module c7, display module c8, display module c9, display module c10, display module c11, display module c12, display module c13, display module c14, display module c15, and display module c16, may be arranged in a quadrangle type, such as a rectangle type or a square type.

The plurality of display modules, display module c1, display module c2, display module c3, display module c4, display module c5, display module c6, display module c7, display module c8, display module c9, display module c10, display module c11, display module c12, display module c13, display module c14, display module c15, and display module c16, may be arranged vertically and horizontally so as to be adjacent to each other. The plurality of display modules, display module c1, display module c2, display module c3, display module c4, display module c5, display module c6, display module c7, display module c8, display module c9, display module c10, display module c11, display module c12, display module c13, display module c14, display module c15, and display module c16, may be arranged in a matrix form of M*N. M and N may be natural numbers. There is no limitation on the number and arrangement method of the plurality of display modules, display module c1, display module c2, display module c3, display module c4, display module c5, display module c6, display module c7, display module c8, display module c9, display module c10, display module c11, display module c12, display module c13, display module c14, display module c15, and display module c16.

The plurality of display modules, display module c1, display module c2, display module c3, display module c4, display module c5, display module c6, display module c7, display module c8, display module c9, display module c10, display module c11, display module c12, display module c13, display module c14, display module c15, and display module c16, may have the same structure. Therefore, a description of one display module may be applied equally to all other display modules.

Each of the plurality of display modules, display module c1, display module c2, display module c3, display module c4, display module c5, display module c6, display module c7, display module c8, display module c9, display module c10, display module c11, display module c12, display module c13, display module c14, display module c15, and display module c16, may include light emitting elements 100: light emitting element 100a, light emitting element 100b, light emitting element 100c having a micro-unit size of several μm to several hundred μm.

Each of the light emitting elements, light emitting element 100a, light emitting element 100b and light emitting element 100c, may form one pixel.

As illustrated in FIG. 4, each of the plurality of light-emitting elements 100: light emitting element 100a, light emitting element 100b, and light emitting element 100c may include a first sub-pixel sp1, a second sub-pixel sp2, and a third sub-pixel sp3.

In the embodiment, a light-emitting element having a horizontal structure, in which the first, second, and third sub-pixels are formed horizontally, is described, but it is also possible to implement a light-emitting element having a vertical structure in which the first, second, and third sub-pixels are formed vertically.

The plurality of light-emitting elements 100: light emitting element 100a, light emitting element 100b, and light emitting element 100c may be arranged adjacent to each other and arranged up, down, left, and right.

The light-emitting elements 100: light emitting element 100a, light emitting element 100b, and light emitting element 100c may have the same structure. A description of the light-emitting element 100a described below may be equally applied to other light-emitting elements, light emitting element 100b and light emitting element 100c.

As illustrated in FIG. 5, the light-emitting element 100 may include a base substrate 101, a glass substrate 102, first electrode 111 and second electrode 112, and first, second, and third semiconductor elements, a plurality of semiconductor elements 113.

The base substrate 101 may include a Thin Film Transistor (TFT) circuit connected to the light-emitting element 100 and configured to transmit a signal for driving the light-emitting element 100.

The TFT circuit may include complementary metal-oxide semiconductor (CMOS) type or n-type MOSFET or p-type MOSFET transistors, but is not limited thereto.

The glass substrate 102 may be a front portion of the display panel 10c and provided to protect components of the light-emitting elements 100.

The first electrode 111 and the second electrode 112 may connect the plurality of semiconductor elements 113 and the TFT circuit of the base substrate 101.

The first electrode 111 may be a positive electrode (anode), and the second electrode 112 may be a negative electrode (cathode).

Either of the first electrode and the second electrode may be a common electrode.

Each of the plurality of semiconductor elements 113 may be a self-luminous element configured to emit red, green, and blue light.

Each of the plurality of semiconductor elements 113 may be a self-light emitting element corresponding to a sub-pixel. For example, a first semiconductor element may be a self-light emitting element corresponding to a red sub-pixel, a second semiconductor element may be a self-light emitting element corresponding to a green sub-pixel, and a third semiconductor element may be a self-light emitting element corresponding to a blue sub-pixel.

Each semiconductor element 113 may include a first semiconductor layer, a second semiconductor layer, and an active layer.

The first semiconductor layer may be disposed adjacent to the base substrate 101.

The first semiconductor layer may include a p-type semiconductor.

The p-type semiconductor may include a p-type gallium nitride (GaN) semiconductor, a p-type aluminum nitride (AlN) semiconductor, or a p-type AlxGa(1–x) N (0≤x≤1) semiconductor.

The p-type semiconductor may be a gallium nitride (GaN) semiconductor doped with Mg, Ca, Zn, Cd, or Hg.

The second semiconductor layer may be disposed adjacent to the glass substrate 102.

The second semiconductor layer may include an n-type semiconductor.

The n-type semiconductor may include an n-type semiconductor created by combining elements from group 3 and group 5. For example, the n-type semiconductor may include n-GaN.

Alternatively, the n-type semiconductor may include an n-AlN semiconductor, or an n-AlxGa semiconductor (1-x) N (0≤x≤1).

The n-type semiconductor may be a silicon (Si)-doped gallium nitride (GaN) or germanium (Ge)-doped gallium nitride (GaN) semiconductor.

The first electrode 111 may be connected to the first semiconductor layer of the semiconductor element. The second electrode 112 may be connected to the second semiconductor layer of the semiconductor element.

The active layer of the semiconductor element may be disposed between the first semiconductor layer and the second semiconductor layer. That is, the first semiconductor layer may be provided in contact with a first surface of the active layer, and the second semiconductor layer may be provided in contact with a second surface of the active layer.

The active layer may include a single quantum well structure (SQW) or a multi-quantum well structure (MQW).

The active layer may be a layer that generates light when receiving energy. The light generated in the active layer may be emitted to the outside through the second semiconductor layer.

In describing principal of the light generation, when a current passes through the active layer, electrons of the second semiconductor layer may combine with holes of the first semiconductor layer in the active layer. Accordingly, light may be generated by the combination of the electrons and holes.

FIG. 5 is only an example of the structure of a light-emitting element of a micro-LED display apparatus, and the structure of the light-emitting element of the micro-LED display apparatus is not limited thereto.

As illustrated in FIG. 6, the plurality of pixels provided on the display panel 10c of the display apparatus may receive a driving signal from a display driver 120. The plurality of pixels may light up and may not light up based on the driving signal, and may emit light of a color corresponding to the driving signal.

The display driver IC (DDI) 120 may transmit a driving signal for displaying an image to pixels of the display panel 10c.

The driving signal for displaying an image may include a scan signal and a source signal.

The display driver IC (DDI) 120 may include a first driver 121 and a second driver 122.

The first driver 121 may include a source line. The first driver 121 may be connected to the base substrate 101 of the display panel 10c via the source line.

The source line of the first driver 121 may transmit a source signal to each pixel of the display panel 10c.

The source signal may be a signal that creates the difference in color that the sub-pixels are to express.

The source signal may include a signal about a current to flow in the sub-pixel.

The first driver 121 may include a source driver integrated circuit.

The second driver 122 may include a scan line. The second driver 122 may be connected to the base substrate 101 of the display panel 10c via the scan line.

The second driver 122 may include a scan driver integrated circuit.

The scan line of the second driver 122 may transmit scan signals to each pixel of the display panel 10c.

The scan signal may be an on-signal or an off-signal for each sub-pixel.

Hereinafter the inspection apparatus 2 will be described with reference to FIG. 1, FIG. 7, and FIG. 8.

Figure 7:
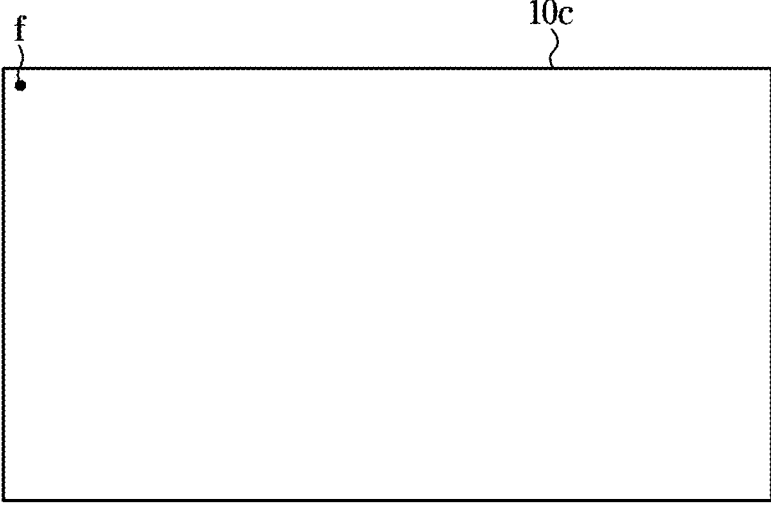
FIG. 7 is a view illustrating a defective pixel of the display apparatus according to one or more embodiments.

FIG. 7 is a view illustrating a defective pixel of the display apparatus according to one or more embodiments, and FIG. 8 is a table of a memory of the inspection apparatus according to one or more embodiments.

The inspection apparatus 2 inspects whether the plurality of pixels of the display panel 10c is defective.

That is, the inspection apparatus 2 detects a defective pixel among the plurality of pixels and recognizes location information of the detected defective pixel.

The inspection apparatus 2 may inspect the plurality of pixels for defects on each display panel.

When the display panel is divided into a plurality of cabinets, the inspection apparatus 2 may inspect the plurality of pixels for defects in each cabinet.

When the display panel is divided into a plurality of display modules, the inspection apparatus 2 may inspect the plurality of pixels for defects in each display module.

The inspection apparatus 2 may include an image sensor 21, a first processor 22, a memory 23, a first communication circuitry 24, a first inputter 25, and a display portion 26.

Among components of the inspection apparatus, the component with the same name as the component of the display apparatus is marked as 'first'.

When inspecting the display panel, a plurality of pixels may light up by receiving a driving signal from the display driver IC (DDI) 120.

The image sensor 21 obtains an image of the display panel 10c, to which a driving signal is applied, and transmits the obtained image of the display panel 10c to the first processor 22.

The image sensor 21 may also obtain images for each of the plurality of cabinets. The image sensor 21 may also obtain images for each of the plurality of display modules.

The embodiment describes image acquisition and detection of defective pixels of the display panel.

The image sensor 21 obtains a first image of the display panel 10c based on a first inspection mode and transmits the obtained first image of the display panel 10c to the first processor 22.

The first inspection mode is a mode that obtains an image related to lighting of sub-pixels of a first color.

The first image may be an image related to a luminance value of sub-pixels of the first color.

The image sensor 21 obtains a second image of the display panel 10c based on a second inspection mode and transmits the obtained second image of the display panel 10c to the first processor 22.

The second inspection mode is a mode that obtains an image related to lighting of sub-pixels of a second color.

The second image may be an image of a luminance value of sub-pixels of the second color.

The image sensor 21 obtains a third image of the display panel 10c based on a third inspection mode and transmits the obtained third image of the display panel 10c to the first processor 22.

The third inspection mode is a mode that obtains an image related to lighting of sub-pixels of a third color.

The third image may be an image of a luminance value of sub-pixels of the third color.

As illustrated in FIG. 7, a defective sub-pixel f of the display panel 10c may not light up due to a circuit open and may appear as a black dot in the image obtained by the image sensor 21.

The image sensor 21 may also obtain an image of the display panel 10c only once based on pixel-by-pixel defect detection.

The image sensor 21 may be an image sensor of a screen adjustment camera.

The image sensor 21 may include a Charge-Coupled Device (CCD) or a Complementary Metal Oxide Semiconductor (CMOS) image sensor.

The image sensor 21 may be an image sensor provided in an infrared camera.

The infrared camera is a camera that detects infrared radiation emitted from an object and recognizes a temperature of the object based on the detected infrared radiation.

The image sensor of the infrared camera is composed of multiple pixels arranged in a two-dimensional structure, and each pixel performs a function of differentiating optical signals according to brightness and converting the optical signals into electrical signals.

The image sensor 21 may be separable from the first processor 22.

The first processor 22 controls the overall operation of the inspection apparatus 2.

The first processor 22 may check whether the display panel 10c and the display driver IC (DDI) 120 are connected, and transmit a driving signal to the display driver IC (DDI) 120 based on the recognition that the display panel 10c and the display driver IC (DDI) 120 are connected.

The display driver IC (DDI) may be provided in the inspection apparatus 2 for inspection of the display panel 10c. In this case, the display driver IC (DDI) of the inspection apparatus 2 may be connected to the display panel 10c.

The display driver IC (DDI) 120 may be provided in the display panel 10c and may also be connected to the inspection apparatus 2 when inspecting the display panel 10c.

The first processor 22 may transmit a driving signal of the sub-pixel of the first color to the display driver IC (DDI) 120 based on the performance of the first inspection mode, transmit a driving signal of the sub-pixel of the second color to the display driver IC (DDI) 120 based on the performance of the second inspection mode, and transmit a driving signal of the sub-pixel of the third color to the display driver IC (DDI) 120 based on the performance of the third inspection mode.

The first color, second color, and third color may all be different colors. For example, the first color may be red R, the second color may be green G, and the third color may be blue B.

The first processor 22 may control an operation of the image sensor 21 and receive an image obtained from the image sensor 21 based on the operation of the image sensor 21.

Particularly, the first processor 22 may control the operation of the image sensor 21 at a time of performing the first inspection mode, control the operation of the image sensor 21 at a time of performing the second inspection mode, and control the operation of the image sensor 21 at a time of performing the third inspection mode.

Based on the first image, second image, and third image received when performing each of the first inspection mode, second inspection mode, and third inspection mode, the first processor 22 may recognize whether each sub-pixel is defective and additionally, whether a sub-pixel is defective by color.

The first processor 22 may recognize whether sub-pixels of the first color are defective, based on the first image, recognize whether sub-pixels of the second color are defective, based on the second image, and recognize whether sub-pixels of the third color are defective, based on the third image.

The first processor 22 may also recognize whether each pixel is defective based on a single image received from the image sensor 21.

The embodiment will be described with an example of a configuration for recognizing whether each sub-pixel is defective.

The first processor 22 recognizes a luminance value of the first image received from the image sensor 21, and particularly, recognizes a luminance value of each sub-pixel of the first color and recognizes whether each sub-pixel of the first color is defective based on the recognized luminance value of each sub-pixel of the first color.

The first processor 22 may compare the luminance value of each sub-pixel of the first color with a reference luminance value. The first processor 22 may recognize a sub-pixel of the first color, which has a luminance value less than or equal to the reference luminance value, as a defective sub-pixel, and a sub-pixel of the first color, which has a luminance value greater than the reference luminance value, as a normal sub-pixel.

The reference luminance value may be the same as or different from a preset luminance value.

The first processor 22 recognizes a luminance value of the second image received from the image sensor 21, and particularly, recognizes a luminance value of each sub-pixel of the second color and recognizes whether each sub-pixel of the second color is defective based on the recognized luminance value of each sub-pixel of the second color.

The first processor 22 may compare the luminance value of each sub-pixel of the second color with a reference luminance value. The first processor 22 may recognize a sub-pixel of the second color, which has a luminance value less than or equal to the reference luminance value, as a defective sub-pixel, and a sub-pixel of the second color, which has a luminance value greater than the reference luminance value, as a normal sub-pixel.

The first processor 22 recognizes a luminance value of the third image received from the image sensor 21, and particularly, recognizes a luminance value of each sub-pixel of the third color and recognizes whether each sub-pixel of the third color is defective based on the recognized luminance value of each sub-pixel of the third color.

The first processor 22 may compare the luminance value of each sub-pixel of the third color with a reference luminance value. The first processor 22 may recognize a sub-pixel of the third color, which has a luminance value less than or equal to the reference luminance value, as a defective sub-pixel, and a sub-pixel of the third color, which has a luminance value greater than the reference luminance value, as a normal sub-pixel.

As mentioned above, the first processor 22 may distinguish between defective sub-pixels and normal sub-pixels based on the recognition results of whether each sub-pixel of the first, second, and third colors is defective.

The first processor 22 may obtain the number of defective sub-pixels and control the display portion 26 to display the number of defective sub-pixels based on the number of the obtained defective sub-pixels being greater than or equal to a reference number.

The first processor 22 may obtain the number of defective sub-pixels for each display module, compare the obtained number of defective sub-pixels for each display module with a reference number, obtain identification information of a display module having the number of defective sub-pixels greater than or equal to the reference number, and control the display portion 26 to display the obtained identification information of the display module and the number of defective sub-pixels.

The first processor 22 recognizes location information of the defective sub-pixels recognized as the defective sub-pixels.

The first processor 22 may recognize the location information of the defective sub-pixels as coordinate information based on a preset reference point in the image obtained by the image sensor 21, and store the recognized coordinate information of the defective sub-pixels in the memory 23.

The first processor 22 may store luminance correction information of the defective sub-pixels as 0 (zero) in the memory 23.

The first processor 22 may also control the display portion 26 to display the coordinate information of the defective sub-pixels.

The first processor 22 recognizes a luminance value of the display panel based on the image received from the image sensor 21.

Particularly, the first processor 22 may recognize a luminance value for each of the plurality of sub-pixels, obtain an average value of the recognized luminance values of the sub-pixels, and recognize the obtained average value as a luminance value of the display panel.

When performing the defect inspection for each display module, the first processor 22 may recognize a luminance value of each of the plurality of sub-pixels for each of the plurality of display modules, obtain an average value for the recognized luminance values of each of the plurality of sub-pixels for each of the display modules, obtain a luminance value for each of the display modules based on the obtained average value, and recognize a luminance value of the display panel based on an average value for the obtained luminance values of the display modules.

The first processor 22 may obtain a minimum luminance value among the luminance values for each of the plurality of display modules.

The first processor 22 may also set luminance correction information of the defective sub-pixels based on the minimum luminance value among the luminance values for each of the plurality of display modules.

The first processor 22 may also set luminance correction information of the defective sub-pixels based on a minimum luminance value among the luminance values of the normal sub-pixels.

The first processor 22 may also obtain luminance correction information of a defective sub-pixel based on a luminance value $(d=m-x)$ that is reduced by a certain value $(x)$ from a minimum value $(m)$ and store the obtained luminance correction information of the defective sub-pixel in the memory 23.

The luminance value $(d)$ that is reduced by the certain value $(x)$ from the minimum value $(m)$ may include a limit value of luminance to be limited in the defective sub-pixel.

The first processor 22 may obtain the luminance value $(d)$ that is reduced by the certain value from the minimum value among the luminance values of the display modules, and obtain luminance correction information for each defective sub-pixel based on a ratio $(r1=d/a)$ of the obtained value $(d)$ to an average luminance value $(a)$ of the display modules.

The luminance correction information for each defective sub-pixel may include a correction value that is close to the value $(d)$ that is reduced by the certain value from the minimum value among the luminance values of the display modules.

The first processor 22 may also store the luminance value $(d=m-x)$ that is reduced by the certain value $(x)$ from the minimum value $(m)$ in the memory as luminance correction information for the defective sub-pixel. In this case, the defective sub-pixel may only operate with the luminance value that is reduced by the certain value $(x)$ from the minimum value $(m)$.

The first processor 22 may obtain luminance correction information for each normal sub-pixel based on a luminance value of each normal sub-pixel and an average value for the luminance of the display panel, and match the obtained luminance correction information for each normal sub-pixel with location information for each normal sub-pixel, and then store the matched information in the memory 23.

For example, the first processor 22 may obtain luminance correction information for each normal sub-pixel based on a ratio $(r2=a/p)$ of an average value $(a)$ to a luminance value $(p)$ for each normal sub-pixel.

The luminance correction information for each normal sub-pixel may include a correction value that is close to the average value.

The location information for each normal sub-pixel may include coordinate information for each normal sub-pixel. The location information for each normal sub-pixel may also include identification information of the display module.

The first processor 22 may match the location information of the defective sub-pixel with the luminance correction information of the defective sub-pixel and store the matched information in the memory 23. The first processor 22 may match the location information of the normal sub-pixel with the luminance correction information of the normal sub-pixel and store the matched information in the memory 23.

As illustrated in FIG. 8, the first processor 22 may write the location information and luminance correction information for each sub-pixel on the memory 23.

The location information for each defective sub-pixel may include the coordinate information for each defective sub-pixel.

The luminance correction information for each defective sub-pixel may include 0 (zero).

The luminance correction information for each defective sub-pixel may include a limit value that includes 0 (zero).

The limit value may be a value determined by the average luminance value $(a)$ of the display modules after obtaining the value $(d)$ that is reduced by the certain value from the minimum value among the luminance values of the display modules.

The location information for each normal sub-pixel may include coordinate information for each normal sub-pixel. The luminance correction information for each normal sub-pixel may include information corresponding to a correction ratio of the luminance for each normal sub-pixel.

When the luminance correction information for each sub-pixel is stored as preset luminance correction information (e.g., 1) in the memory 23, the first processor 22 may change and store the luminance correction information for each sub-pixel based on the results of the defect inspection of the display apparatus.

When the information is not written on the memory, the first processor 22 may also transmit the location information and luminance correction information for each sub-pixel to the display apparatus 1.

When the display modules are individually inspected for defects, the first processor 22 may also convert coordinates for each sub-pixel based on the identification information for each display module and store the converted coordinate information for each sub-pixel.

For example, when first display module, second display module, and third display module are provided, the first processor 22 may identify whether the first display module is at a reference position on the display panel based on the identification information and arrangement position of the first display module, and maintain the coordinates for each sub-pixel provided in the first display module based on the position of the first display module being identified as the reference position.

The first processor 22 may convert coordinates for each sub-pixel provided in the second display module from initial coordinates $(xo, yo)$ to new coordinates $(xn, yn)$ based on the identification information and arrangement information of the second display module, and convert coordinates for each sub-pixel provided in the third display module from initial coordinates $(xo, yo)$ to new coordinates $(xm, ym)$ based on the identification information of the third display module, and store the converted coordinate information for each sub-pixel of the second display module and third display modules.

The first processor 22 may perform the above-described operation using data stored in a built-in memory of the inspection apparatus.

The first processor 22 may include hardware such as a central processing unit (CPU) or memory, and software such as a control program. For example, the first processor 22 may include at least one memory storing algorithm and program-type data for controlling the operation of components within the display apparatus, and one or more processor chips or one or more processing cores configured to perform the above-described operations using the data stored in the at least one memory.

The first processor 22 may include a separate neural network processing unit (NPU) configured to perform an operation of an artificial intelligence model and may include a graphics processor (GPU), etc.

The memory 23 may be provided to be removable. The memory 23 may include a non-volatile memory.

The memory 23 may be electrically and physically connected to the display apparatus 1 and the inspection apparatus 2.

The memory 23 may store a table in which the location information and the luminance correction information for each sub-pixel are matched based on a control command of the first processor 22.

The memory 23 may further store identification information of the display module and may store location information, i.e. coordinate information, of sub-pixel for each display module.

The memory 23 may store the coordinate information for each sub-pixel.

The memory 23 may be connected to the display apparatus 1 on which the inspection is completed.

The inspection apparatus 2 may further include a built-in memory.

The built-in memory may store data for an algorithm for controlling an operation of components within the inspection apparatus 2 or a program reproducing the algorithm.

The built-in memory and the first processor 22 may be implemented as separate chips. Alternatively, the built-in memory and the first processor 22 may be implemented as a single chip.

The built-in memory may be implemented using at least one of a non-volatile memory element, such as a cache, a Read Only Memory (ROM), a Programmable ROM (PROM), an Erasable Programmable ROM (EPROM), an Electrically Erasable Programmable ROM (EEPROM) and a flash memory, a volatile memory element, such as a Random Access Memory (RAM), or a storage medium, such as a Hard Disk Drive (HDD) and a CD-ROM, but is not limited thereto.

The first communication circuitry 24 may perform communication between internal components of the inspection apparatus 2 or communication with the display apparatus 1.

The first communication circuitry 24 may transmit the location information and luminance correction information for each sub-pixel to the display apparatus 1 based on the control command of the first processor.

The first communication circuitry 24 may support establishment of a direct (e.g. wired) communication channel or wireless communication channel with the display apparatus 1, and performance of communication through the established communication channel.

According to one embodiment, the first communication circuitry 24 may include a wireless communication module (e.g., a cellular communication module, a short-range wireless communication module, or a global navigation satellite system (GNSS) communication module) or a wired communication module (e.g., a local area network (LAN) communication module, or a power line communication module).

Among these communication modules, the communication module corresponding to the first communication circuitry 24 may communicate with an external device through a first network (e.g., a short-range wireless communication network such as Bluetooth, wireless fidelity (Wi-Fi) direct, or infrared data association (IrDA)) or a second network (e.g., a long-range wireless communication network such as a legacy cellular network, a 5G network, a next-generation communication network, the Internet, or a computer network (e.g., LAN or WAN)). These various types of communication modules may be integrated as one component (e.g., a single chip) or implemented as a plurality of separate components (e.g., multiple chips).

The short-range wireless communication module may include a Bluetooth communication module, a Bluetooth Low Energy (BLE) communication module, a near field communication module, a WLAN (Wi-Fi) communication module, a Zigbee communication module, an infrared data association (IrDA) communication module, a Wi-Fi Direct (WFD) communication module, an ultrawideband (UWB) communication module, an Ant+ communication module, a microwave (uWave) communication module, etc., but is not limited thereto.

The first inputter 25 may receive a user input.

The first inputter 25 may receive an inspection start command, an inspection end command, etc. of the display apparatus.

The first inputter 25 may receive a transmission method of the luminance correction information for each sub-pixel. The transmission method may include a transmission method to the display apparatus through communication and a transmission method to the memory 23.

The first inputter 25 may include a tact switch, a push switch, a slide switch, a toggle switch, a micro switch, a touch switch, a touch pad, a touch screen, a jog dial, and/or a microphone.

The display portion 26 may display inspection result information of the display apparatus and may display inspection progress information.

The inspection result information of the display apparatus may include the number of defective sub-pixels and location information of defective sub-pixels.

The display portion 26 may be provided as a Cathode Ray Tube (CRT), a Digital Light Processing (DLP) panel, a plasma display panel, a Liquid Crystal Display (LCD) panel, an Electro Luminescence (EL) panel, an Electrophoretic Display (EPD) panel, an Electro chromic Display (ECD) panel, a Light Emitting Diode (LED) panel or an Organic Light Emitting Diode (OLED) panel, but is not limited thereto.

At least one component may be added or removed according to the performance of the components of the inspection apparatus shown in FIG. 1. In addition, it should be readily understood by those skilled in the art that the mutual positions of the components may be changed in accordance with the performance or structure of the system.

Meanwhile, each component illustrated in FIG. 1 represents software and/or hardware components such as a Field Programmable Gate Array (FPGA) and an Application Specific Integrated Circuit (ASIC).

Figure 9:
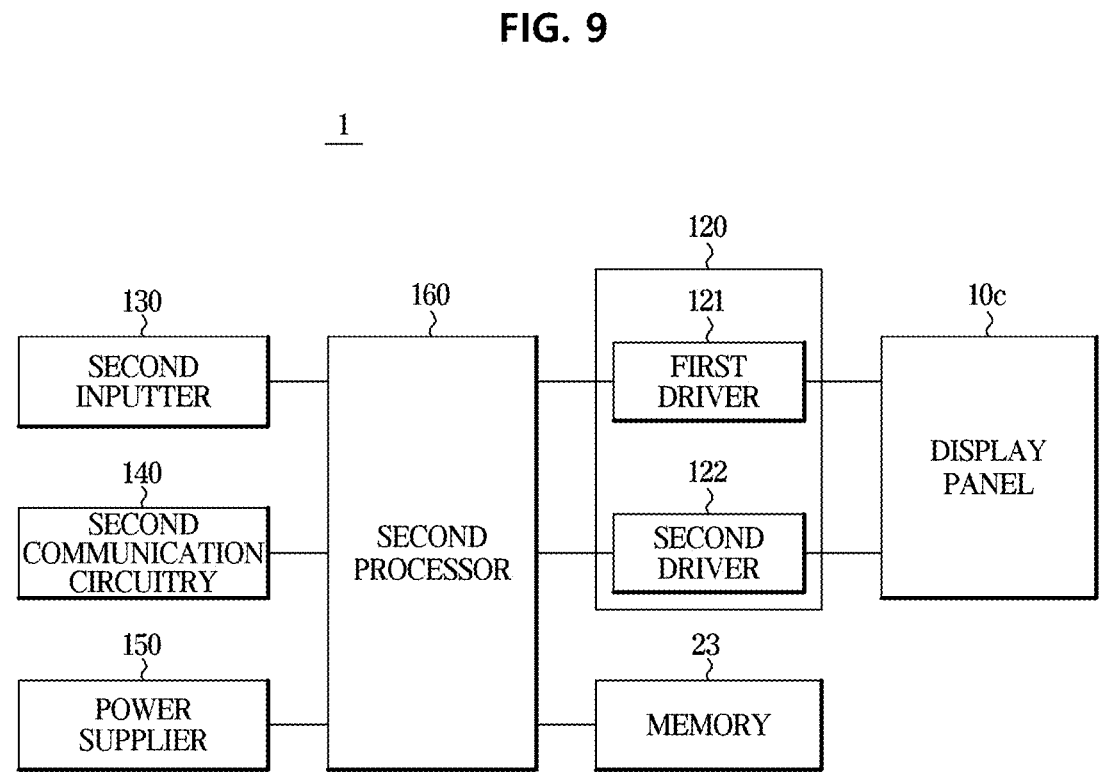

FIG. 9 is a control diagram of the display apparatus according to one embodiment, which is described with reference to FIG. 10 and FIG. 11.

Figure 10:
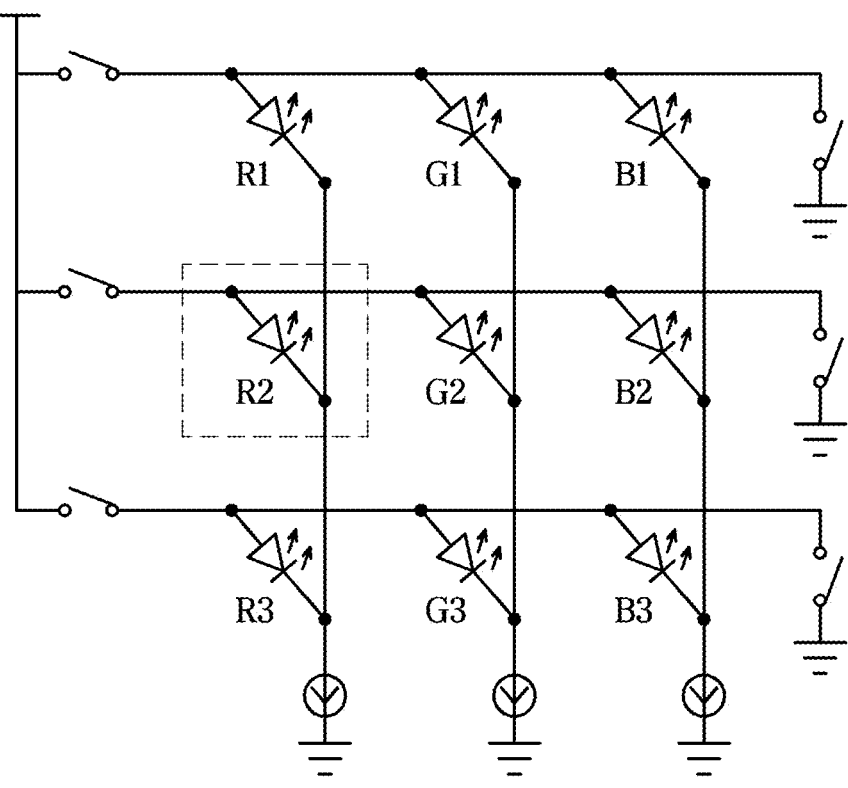
FIG. 10 is a view illustrating a sub-pixel provided in the display apparatus according to one or more embodiments.
Figure 11:
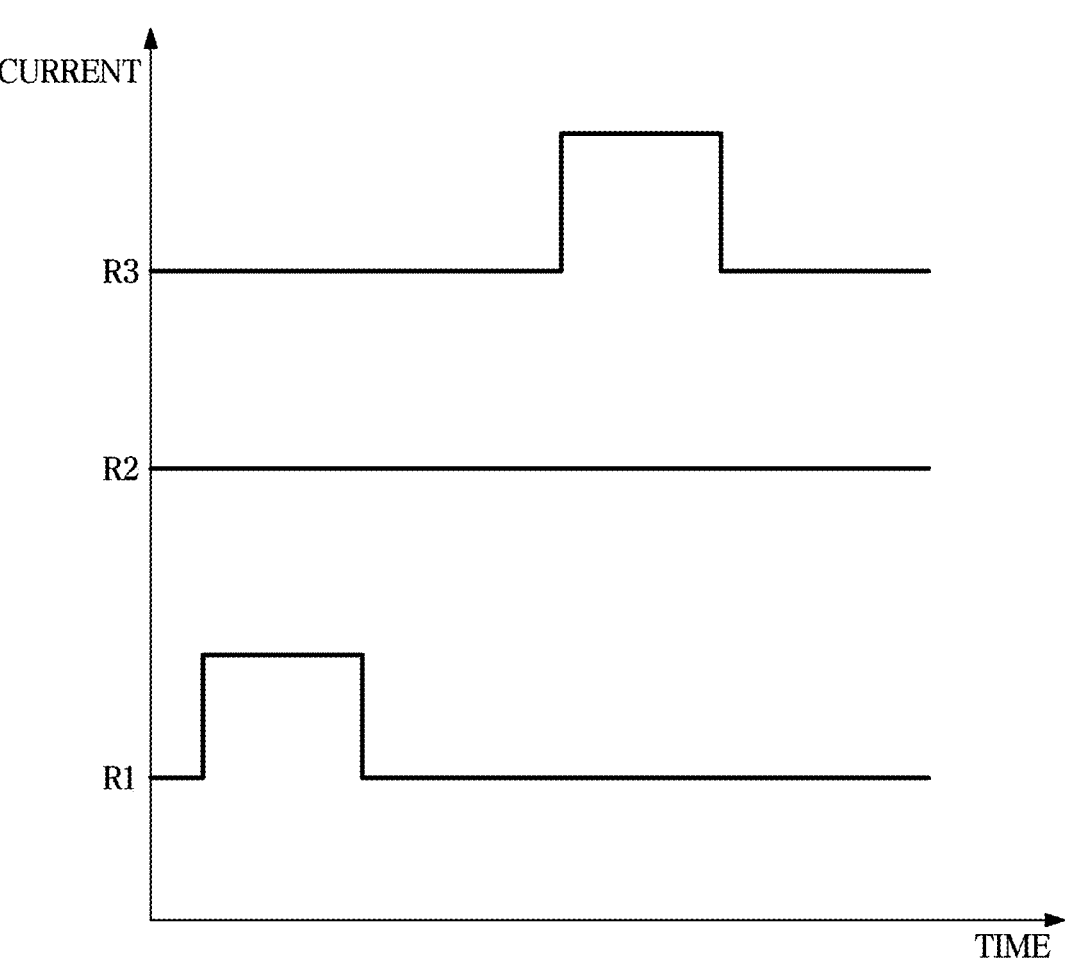
FIG. 11 is a view illustrating an electrical signal transmitted to the sub-pixel of the display apparatus according to one or more embodiments.

FIG. 10 is a view illustrating a sub-pixel provided in the display apparatus according to one or more embodiments, and FIG. 11 is a view illustrating an electrical signal transmitted to the sub-pixel of the display apparatus according to one or more embodiments.

The display apparatus 1 includes the display panel 10*c*, the display driver IC (DDI) 120, the memory 23, a second inputter 130, a second communication circuitry 140, a power supplier 150, and a second processor 160.

Among components of the display apparatus, the component with the same name as the component of the inspection apparatus is to be marked as 'second'.

The display panel 10c may include the plurality of pixels. Each pixel may include the first sub-pixel, second sub-pixel, and third sub-pixel.

The display driver IC (DDI) 120 transmits a driving signal to the display panel 10c based on a control command of the second processor 160.

The driving signal may include a source signal and a scan signal.

The first driver 121 of the display driver IC (DDI) 120 transmits an electric signal to a normal sub-pixel based on a driving signal received from the second processor 160.

The first driver 121 of the display driver IC (DDI) 120 does not transmit an electric signal to the defective sub-pixel at a time of driving the defective sub-pixel based on the driving signal received from the second processor 160. The electric signal may include a current signal.

That is, the first driver 121 of the display driver IC (DDI) 120 does not apply a current signal to the defective sub-pixel at the time of driving the defective sub-pixel based on the control command of the second processor 160.

The memory 23 may be a removable memory.

The memory 23 may include a non-volatile memory.

The memory 23 may be provided in the inspection apparatus 2 when inspecting the display apparatus 1. After the inspection of the display apparatus 1 is completed, the memory 23 may be separated from the inspection apparatus 2 and provided in the display apparatus 1.

The memory 23 stores the location information and luminance correction information for each sub-pixel of the display panel as a table.

The luminance correction information for each sub-pixel may include location information and luminance correction information of the defective sub-pixel and location information and luminance correction information of the normal sub-pixel.

The location information for each sub-pixel may include coordinate information.

The luminance correction information of the defective sub-pixel may include 0 (zero) or a correction value that is close to 0 (zero).

The memory 23 may also write luminance correction information for each sub-pixel received from the second communication circuitry based on the control command of the second processor 160.

The second inputter 130 receives a user input.

The second inputter 130 may receive an on/off command of the display apparatus, a channel up/down command, and a volume up/down command.

The second inputter 130 may receive a content selection command.

The second inputter 130 may also receive a read command of the memory 23 and a command to reflect luminance correction information for each sub-pixel.

The second inputter 130 may include a tact switch, a push switch, a slide switch, a toggle switch, a micro switch, a touch switch, a touch pad, a touch screen, a jog dial, and/or a microphone.

The second communication circuitry 140 may perform communication between internal components of the display apparatus 1 or communication with the inspection apparatus 2.

The second communication circuitry 140 may receive the location information and luminance correction information for each sub-pixel transmitted from the inspection apparatus 2 and transmit the received location information and luminance correction information for each sub-pixel to the second processor 160.

The second communication circuitry 140 may communicate with an external device.

The external device may include a personal computer, a laptop, a tablet PC, a terminal, a portable telephone, a smart phone, a handheld device, a wearable device, and a set-top box, but is not limited thereto.

The external device may further include a portable storage device such as a USB memory and a hard disk.

The external device may be a device that stores at least one of image information and sound information and transmits at least one of the stored image information and sound information to the display apparatus 1.

The second communication circuitry 140 may support establishment of a direct (e.g. wired) communication channel or wireless communication channel with the external device and the inspection apparatus 2, and performance of communication through the established communication channel.

A specific example of the second communication circuitry 140 is the same as the first communication circuitry 24 of the inspection apparatus, and thus a description thereof will be omitted.

The power supplier 150 supplies the power required to drive each component of the display apparatus 1.

The power supplier 150 may receive external commercial power, convert the commercial power into an amount of power, current, and voltage required to drive each component of the display apparatus 1, and supply the required power, voltage, and current to each component.

The power supplier 150 may also supply standby power to each component of the display apparatus 1 based on the control command of the second processor 160.

When power is first supplied after the display apparatus is produced, the second processor 160 may identify whether a table for luminance correction of the display panel is stored in the memory 23. Further, based on identifying that the table is not stored in the memory 23, the second processor 160 may control communication with the inspection apparatus 2, and request the table from the inspection apparatus 2.

The second processor 160 may transmit identification information of the display apparatus 1 upon the request for the table from the inspection apparatus 2.

When the table is received from the inspection apparatus 2, the second processor 160 may also store the received table in the memory 23.

The second processor 160 may read the table stored in the memory 23 based on receiving the power-on command and the content selection command.

The second processor 160 corrects luminance information for each sub-pixel based on the image information of the content and the luminance correction information of the table stored in the memory 23.

The second processor 160 generates a driving signal for each sub-pixel based on the corrected luminance information for each sub-pixel and transmits the generated driving signal for each sub-pixel to the first driver 121.

The corrected luminance information for each sub-pixel may include 0 (zero) as luminance information of the defective sub-pixel.

The driving signal for each sub-pixel transmitted to the first driver may be a signal for controlling a current flowing to each sub-pixel.

The first driver 121 generates an electric signal for each sub-pixel based on the driving signal received from the second processor 160, and transmits the generated electric signal for each sub-pixel to each of the sub-pixel.

The electrical signal may include a current signal.

The first driver 121 does not transmit an electric signal to the defective sub-pixel based on the coordinate information of the defective sub-pixel. That is, the first driver 121 prevents a current signal from flowing to the defective sub-pixel based on the coordinate information of the defective sub-pixel.

The first driver 121 may sequentially transmit an electric signal to sub-pixels by color. This will be described with reference to FIG. 10.

When the first sub-pixel R1, second sub-pixel R2, and third sub-pixel R3 of the first color are all normal sub-pixels, the first driver 121 transmits a current signal to the first sub-pixel R1 of the first color, then transmits a current signal to the second sub-pixel R2 of the first color, and then transmits a current signal to the third sub-pixel R3 of the first color.

When the first sub-pixel G1, second sub-pixel G2, and third sub-pixel G3 of the second color are all normal sub-pixels, the first driver 121 transmits a current signal to the first sub-pixel G1 of the second color, then transmits a current signal to the second sub-pixel G2 of the second color, and then transmits a current signal to the third sub-pixel G3 of the second color.

When the first sub-pixel B1, second sub-pixel B2, and third sub-pixel B3 of the third color are all normal sub-pixels, the first driver 121 transmits a current signal to the first sub-pixel B1 of the third color, then transmits a current signal to the second sub-pixel B2 of the third color, and then transmits a current signal to the third sub-pixel B3 of the third color.

The first driver 121 may simultaneously transmit current signals to the sub-pixels of the first, second, and third colors as a pair. For example, the first driver 121 may transmit a current signal simultaneously to sub-pixel R1, sub-pixel G1 and sub-pixel B1 of a first pair, then transmit a current signal simultaneously to sub-pixel R2, sub-pixel G2 and sub-pixel B2 of a second pair, and then transmit a current signal simultaneously to sub-pixel R3, sub-pixel G3 and sub-pixel B3 of a third pair.

A case, in which the second sub-pixel R2 of the first color is a defective sub-pixel and the first sub-pixel R1 and third sub-pixel R3 of the first color are normal sub-pixels, will be described.

As illustrated in FIG. 11, the first driver 121 transmits a current signal to the first sub-pixel R1 of the first color. When it is time to transmit a current signal to the second sub-pixel R2 of the first color, the first driver 121 does not transmit a current signal to the second sub-pixel R2 of the first color, and when it is time to transmit a current signal to the third sub-pixel R3 of the first color, the first driver 121 transmits a current signal to the third sub-pixel R3 of the first color.

When it is time to transmit a current signal to the second sub-pixel R2, sub-pixel G2 and sub-pixel B2 of the second pair, the first driver 121 may not transmit a current signal to the second sub-pixel R2 of the first color and transmit a current signal to the second sub-pixel G2 and sub-pixel B2 of the second and third colors.

The first driver 121 may limit the transmission of the current signal of the defective sub-pixel.

That is, the first driver 121 may ignore the transmission of the current signal of the defective sub-pixel.

As another example, the corrected luminance information for each sub-pixel may include a limit value as luminance information of defective sub-pixels. The limit value may be a correction value including 0 (zero).

For example, the limit value may include a value that is reduced by a certain value from a minimum value among luminance values of normal sub-pixels.

The limit value may include a value that is reduced by a certain value from a minimum value among luminance values of the display modules.

A correction value for the luminance correction of the defective sub-pixels may all be the same as the limit value.

The first driver may obtain a current value corresponding to the limit value and transmit a current signal corresponding to the obtained current value to each of the defective sub-pixels. The first driver may limit the current signal transmitted to each of the defective sub-pixels based on the limit value.

The current value corresponding to the luminance value of the sub-pixel may be information obtained through a test and stored in advance.

The second processor 160 may perform the above-described operation using data stored in a built-in memory.

The second processor 160 may include hardware such as a CPU or memory, and software such as a control program. For example, the second processor 160 may include at least one memory storing an algorithm and program-type data for controlling the operation of components within the display apparatus, and one or more processor chips or one or more processing cores configured to perform the above-described operation using the data stored in the at least one memory.

The second processor 160 may include a separate NPU configured to perform an operation of an artificial intelligence model and may include a graphics processor (GPU), etc.

The display apparatus 1 may further include a built-in memory.

The built-in memory may store data for an algorithm for controlling the operation of components within the display apparatus 1 or a program reproducing the algorithm.

The built-in memory and the second processor 160 may be implemented as separate chips. Alternatively, the built-in memory and the second processor 160 may be implemented as a single chip.

The built-in memory may be implemented as at least one of a non-volatile memory element, such as a cache, a Read Only Memory (ROM), a Programmable ROM (PROM), an Erasable Programmable ROM (EPROM), an Electrically Erasable Programmable ROM (EEPROM) and a flash memory, a volatile memory element, such as a Random Access Memory (RAM), or a storage medium, such as a Hard Disk Drive (HDD) and a CD-ROM, but is not limited thereto.

At least one component may be added or removed according to the performance of the components of the display apparatus shown in FIG. 9. In addition, it should be readily understood by those skilled in the art that the mutual positions of the components may be changed in accordance with the performance or structure of the system.

Meanwhile, each component illustrated in FIG. 9 represents software and/or hardware components such as a Field Programmable Gate Array (FPGA) and an Application Specific Integrated Circuit (ASIC).

Figure 12:
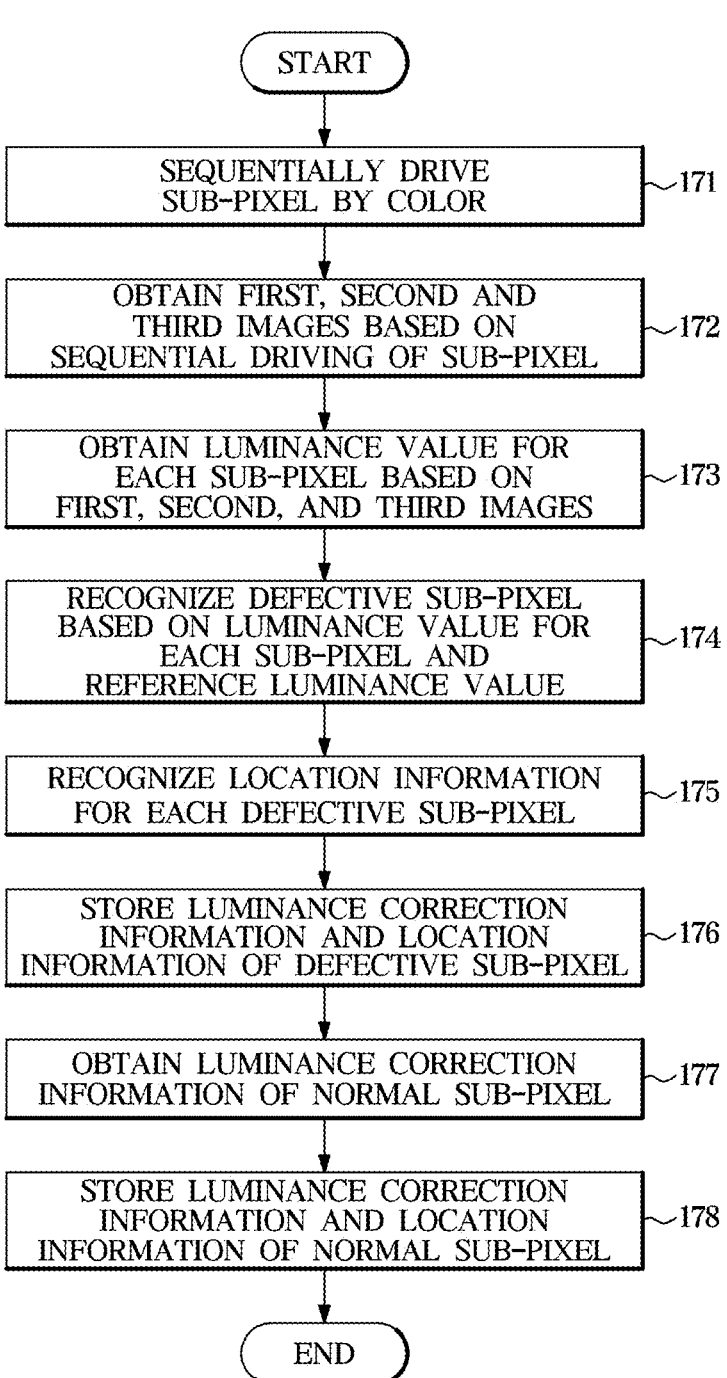
FIG. 12 is a control flowchart of the inspection apparatus according to one or more embodiments.

FIG. 12 is a control flowchart of the inspection apparatus according to one embodiment.

The inspection apparatus identifies whether to be connected to the display panel 10*c* via the display driver IC (DDI).

The inspection apparatus sequentially drives the sub-pixels by color based on the identification that the display panel 10*c* is connected at step 171, and obtains an image of the sub-pixel by color based on the sequential driving of the sub-pixels at step 172. This will be described in more detail.

The inspection apparatus controls the performance of the first inspection mode and transmits a driving signal of the sub-pixel of the first color to the display driver IC (DDI) 120 based on the performance of the first inspection mode.

Based on the lighting of the sub-pixels of the first color of the display panel, the inspection apparatus obtains a first image of the display panel 10*c* using the image sensor 21.

The inspection apparatus controls the performance of the second inspection mode based on the completion of the first inspection mode.

The inspection apparatus transmits a driving signal of the sub-pixel of the second color to the display driver IC (DDI) 120 based on the performance of the second inspection mode.

Based on the lighting of the sub-pixels of the second color of the display panel, the inspection apparatus obtains a second image of the display panel 10*c* using the image sensor 21.

The inspection apparatus controls the performance of the third inspection mode based on the completion of the second inspection mode.

The inspection apparatus transmits a driving signal of the sub-pixel of the third color to the display driver IC (DDI) 120 based on the performance of the third inspection mode.

Based on the lighting of the sub-pixels of the third color of the display panel, the inspection apparatus obtains a third image of the display panel 10*c* using the image sensor 21.

The first, second, and third colors may all be different colors. For example, the first color may be red R, the second color may be green G, and the third color may be blue B.

Based on the first image, second image, and third image received when performing each of the first inspection mode, second inspection mode, and third inspection mode, the inspection apparatus may recognize whether each sub-pixel is defective and additionally, whether a sub-pixel is defective by color.

The first image, second image, and third image may include luminance images of sub-pixels for each color.

The inspection apparatus obtains a luminance value for each sub-pixel based on the first image, second image, and third image at step 173.

The inspection apparatus recognizes defective sub-pixels based on the luminance value for each sub-pixel and a reference luminance value at step 174. This will be described in more detail.

The inspection apparatus may recognize a luminance value of each sub-pixel of the first color based on the first image, compare the recognized luminance value of each sub-pixel of the first color with a reference luminance value, recognize a sub-pixel of the first color having a luminance value less than or equal to the reference luminance value as a defective sub-pixel, and recognize a sub-pixel of the first color having a luminance value greater than the reference luminance value as a normal sub-pixel.

The inspection apparatus may recognize a luminance value of each sub-pixel of the second color based on the second image, compare the recognized luminance value of each sub-pixel of the second color with a reference luminance value, recognize a sub-pixel of the second color having a luminance value less than or equal to the reference luminance value as a defective sub-pixel, and recognize a sub-pixel of the second color having a luminance value greater than the reference luminance value as a normal sub-pixel.

The inspection apparatus may recognize a luminance value of each sub-pixel of the third color based on the third image, compare the recognized luminance value of each sub-pixel of the third color with a reference luminance value, recognize a sub-pixel of the third color having a luminance value less than or equal to the reference luminance value as a defective sub-pixel, and recognize a sub-pixel of the third color having a luminance value greater than the reference luminance value as a normal sub-pixel.

As mentioned above, the inspection apparatus may distinguish between a defective sub-pixel and a normal sub-pixel based on the recognition result of whether or not each sub-pixel is defective.

The inspection apparatus may obtain the number of defective sub-pixels and display the number of defective sub-pixels on the display portion 26 based on the obtained number of defective sub-pixels being greater than or equal to a reference number.

The inspection apparatus may obtain the number of defective sub-pixels for each display module, compare the obtained number of defective sub-pixels for each display module with a reference number, obtain identification information of a display module having the number of defective sub-pixels greater than or equal to the reference number, and also display the obtained identification information of the display module and the number of defective sub-pixels on the display portion 26.

The inspection apparatus recognizes location information for each defective sub-pixel at step 175.

Particularly, the inspection apparatus may recognize the location information of the defective sub-pixels as coordinate information based on a preset reference point in the first, second, and third images obtained by the image sensor 21, and store the recognized coordinate information of the defective sub-pixels in the memory 23.

The inspection apparatus may store the luminance correction information of the defective sub-pixels as 0 (zero) in the memory 23, and match the luminance correction information with the coordinate information of the defective sub-pixels and then store the matched information in the memory 23 at step 176.

The inspection apparatus obtains luminance correction information of normal sub-pixels (177). This will be described in more detail.

The inspection apparatus recognizes the luminance value of the display panel based on the image received from the image sensor 21.

Particularly, the inspection apparatus may recognize luminance values of each of the plurality of sub-pixels, obtain an average value of the recognized luminance values of the sub-pixels, and recognize the obtained average value as a luminance value of the display panel.

The inspection apparatus may recognize a luminance value of each of the plurality of sub-pixels for each of the plurality of display modules, obtain an average value for the recognized luminance values of each of the plurality of sub-pixels for each of the display modules, obtain a luminance value of each of the display modules based on the obtained average value, and recognize a luminance value of the display panel based on an average value for the obtained luminance values of the display modules.

The inspection apparatus may obtain luminance correction information for each normal sub-pixel based on the luminance value and average value for each normal sub-pixel, and match the obtained luminance correction information for each normal sub-pixel with the location information for each normal sub-pixel and then store the matched information in the memory 23.

For example, the inspection apparatus may obtain luminance correction information for each normal sub-pixel based on the ratio (r2=a/p) of the average value (a) to the luminance value (p) for each normal sub-pixel.

The luminance correction information for each normal sub-pixel may include a correction value that is close to the average value.

The location information for each normal sub-pixel may include coordinate information for each normal sub-pixel.

The location information for each normal sub-pixel may also include identification information of the display module.

The inspection apparatus may match the location information of the normal sub-pixel with the luminance correction information and store the matched information in the memory 23 at step 178.

The inspection apparatus may write the location information and luminance correction information for each sub-pixel on the memory 23.

Figure 13:
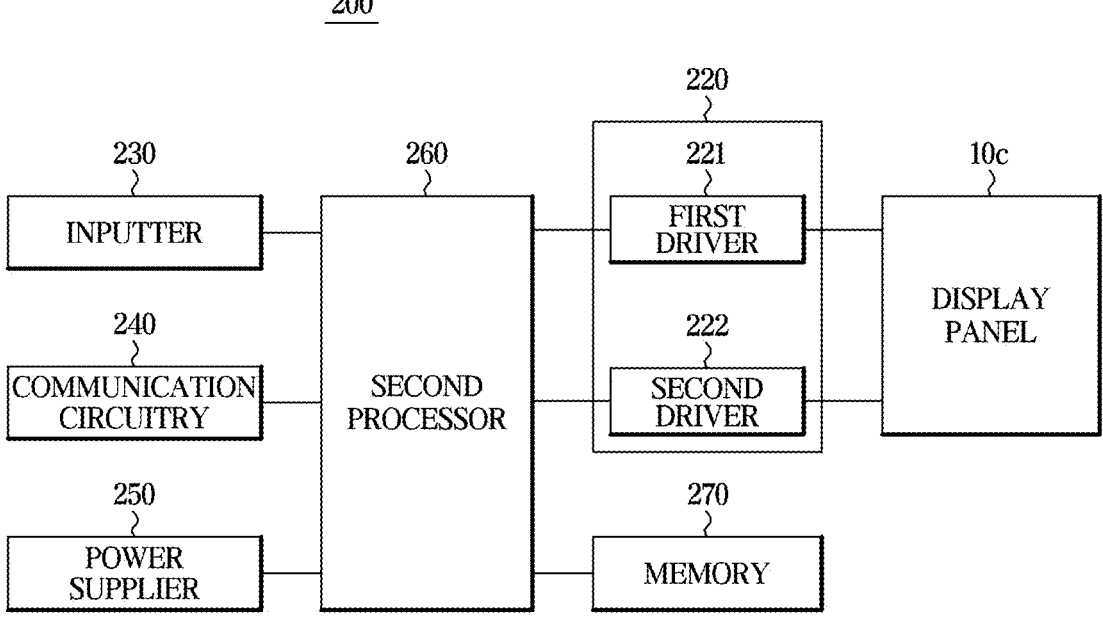
FIG. 13 is a control diagram of a display apparatus according to or more embodiments.

FIG. 13 is a control diagram of a display apparatus according to another embodiment.

A display apparatus 200 includes a display panel 10c, a display driver 220, an inputter 230, a communication circuitry 240, a power supplier 250, a processor 260, and a memory 270.

The display panel 10c according to another embodiment is identical to the display panel of one embodiment, and thus a description thereof will be omitted.

When performing a defective pixel detection mode, the display driver 220 detects a voltage value applied to a plurality of sub-pixels provided on the display panel 10c based on a control command of the processor 260 and transmits the detected voltage values for each sub-pixel to the processor 260.

The display driver 220 may detect the voltage value applied to the sub-pixels using a first driver 221.

When performing an image display mode, the display driver 220 transmits a driving signal to the plurality of sub-pixels based on a control command of the processor 260.

The inputter 230 receives a user input.

The inputter 230 may receive an on-command, an off-command of the display apparatus 200, a channel up/down command, and a volume up/down command.

The inputter 230 may receive a content selection command.

The inputter 230 may receive the defective pixel detection mode and the image display mode.

The communication circuitry 240 may perform communication between internal components of the display apparatus 200 or communication with an external device 2.

The communication circuitry 240 is identical to the second communication circuitry of one embodiment and thus a description thereof will be omitted.

The power supplier 250 is also identical to the power supplier of one embodiment and thus a description thereof will be omitted.

The processor 260 may transmit a command to detect voltage values for each sub-pixel to the display driver 220 based on the performance of the defective pixel detection mode.

The processor 260 may receive voltage values for each sub-pixel from the display driver 220 based on the performance of the defective pixel detection mode, and compare the received voltage values for each sub-pixel with a reference voltage value so as to recognize a defective sub-pixel.

The processor 260 may recognize a sub-pixel having a voltage value less than or equal to the reference voltage value, for each received sub-pixel and recognize the recognized sub-pixel as a defective sub-pixel, and recognize a sub-pixel having a voltage value greater than the reference voltage value, for each received sub-pixel as a normal sub-pixel.

The processor 260 may recognize location information of a defective sub-pixel and store the recognized location information and luminance correction information of the defective sub-pixel in the memory 270.

The luminance correction information of the defective sub-pixel may be 0 (zero).

The processor 260 may obtain the number of defective sub-pixels and control the display panel 10c to display the number of defective sub-pixels based on the obtained number of defective sub-pixels being greater than or equal to a reference number.

The processor 260 may obtain the number of defective sub-pixels for each display module, compare the obtained number of defective sub-pixels for each display module with a reference number, obtain identification information of a display module having the number of defective sub-pixels greater than or equal to the reference number, and control the display panel 10c to display the obtained identification information of the display module and the number of defective sub-pixels.

The processor 260 may also obtain a current value for each sub-pixel from a source line of the first driver of the display driver.

The processor 260 may recognize the luminance value of the display panel based on the voltage value or current value of the sub-pixels.

The luminance value corresponding to the current value may be information obtained through a test and may be stored in advance. The luminance value corresponding to the voltage value may be information obtained through a test and may be stored in advance.

Particularly, the processor 260 may recognize a luminance value of each of the plurality of sub-pixels, obtain an average value of the recognized luminance values of the sub-pixels, and recognize the obtained average value as the luminance value of the display panel.

The processor 260 may recognize a luminance value of each of the plurality of sub-pixels for each of the plurality of display modules, obtain an average value for the recognized luminance values of each of the plurality of sub-pixels for each of the display modules, obtain luminance values of each of the display modules based on the obtained average value, and recognize a luminance value of the display panel based on an average value for the obtained luminance values of the display modules.

The processor 260 may obtain luminance correction information for each normal sub-pixel based on the luminance value and average value for each normal sub-pixel, and match the obtained luminance correction information for each normal sub-pixel with the location information for each normal sub-pixel and store the matched information in the memory 270.

For example, the processor 260 may obtain luminance correction information for each normal sub-pixel based on a ratio (r2=a/p) of an average value (a) to a luminance value (p) for each normal sub-pixel.

The luminance correction information for each normal sub-pixel may include a correction value that is close to the average value.

The location information for each normal sub-pixel may include coordinate information for each normal sub-pixel.

The location information for each normal sub-pixel may also include identification information of the display module.

The processor 260 may match the location information of the defective sub-pixel with the luminance correction information and store the matched information in the memory 270, and match the location information of the normal sub-pixel with the luminance correction information and store the matched information in the memory 270.

When performing the image displaying mode, the processor 260 may read a table stored in the memory 270 based on receiving the power-on command and the content selection command.

The processor 260 corrects luminance information for each sub-pixel based on the image information of the content and luminance correction information of the table stored in the memory 270.

The processor 260 generates a driving signal for each sub-pixel based on the corrected luminance information for each sub-pixel and transmits the generated driving signal for each sub-pixel to the first driver 221.

The corrected luminance information for each sub-pixel may include 0 (zero) as luminance information of the defective sub-pixel.

The driving signal for each sub-pixel transmitted to the first driver may be a signal for controlling a current flowing to each sub-pixel.

The first driver 221 generates an electric signal for each sub-pixel based on the driving signal received from the processor 260 and transmits the generated electric signal for each sub-pixel to each of the sub-pixels.

The electrical signal may include a current signal.

The first driver 221 does not transmit an electric signal to the defective sub-pixel based on the coordinate information of the defective sub-pixel. That is, the first driver 221 prevents the current signal from flowing to the defective sub-pixel based on the coordinate information of the defective sub-pixel.

As mentioned above, by preventing the current from flowing to the defective sub-pixel, it is possible to prevent an accident in which a normal sub-pixel electrically connected to the defective sub-pixel lights up when the normal sub-pixel should not light up.

The memory 270 may store location information and luminance correction information of defective sub-pixels and location information and luminance correction information of normal sub-pixels as a luminance correction table.

The memory 270 may store data for an algorithm for controlling the operation of components within the display apparatus 200 or a program reproducing the algorithm.

The memory 270 and the processor 260 may be implemented as separate chips. Alternatively, the memory 270 and the processor 260 may be implemented as a single chip.

The memory 270 may be implemented using at least one of a non-volatile memory element, such as a cache, a Read Only Memory (ROM), a Programmable ROM (PROM), an Erasable Programmable ROM (EPROM), an Electrically Erasable Programmable ROM (EEPROM) and a flash memory, a volatile memory element, such as a Random Access Memory (RAM), or a storage medium, such as a Hard Disk Drive (HDD) and a CD-ROM, but is not limited thereto.

Meanwhile, the disclosed embodiments may be embodied in the form of a recording medium storing instructions executable by a computer. The instructions may be stored in the form of program code and, when executed by a processor, may generate a program module to perform the operations of the disclosed embodiments. The recording medium may be embodied as a computer-readable recording medium.

The computer-readable recording medium includes all kinds of recording media in which instructions which can be decoded by a computer are stored. For example, there may be a Read Only Memory (ROM), a Random Access Memory (RAM), a magnetic tape, a magnetic disk, a flash memory, and an optical data storage device.

While the present disclosure has been particularly described with reference to exemplary embodiments, it should be understood by those of skilled in the art that various changes in form and details may be made without departing from the spirit and scope of the present disclosure.

What is claimed is:

1. A display apparatus comprising:
a display panel comprising a plurality of sub-pixels;
a memory storing location information of a defective sub-pixel among the plurality of sub-pixels, and storing normal location information and normal luminance correction information for each of normal sub-pixels among the plurality of sub-pixels; and
a processor configured to limit an electrical signal transmitted to the defective sub-pixel based on the location information of the defective sub-pixel stored in the memory,
wherein the normal luminance correction information for each of the normal sub-pixels comprises information corresponding to an average value of luminance values of the plurality of sub-pixels and a luminance value for each of the normal sub-pixels.

2. The display apparatus of claim 1,
wherein the processor is further configured to obtain normal luminance information for each of the normal sub-pixels based on image information, is further configured to correct the obtained normal luminance information for each of the normal sub-pixels based on the normal location information and the normal luminance correction information for each of the normal sub-pixels, is further configured to generate an electric signal for each of the normal sub-pixels based on the corrected normal luminance information for each of the normal sub-pixels, and is further configured to transmit the generated electric signal to each of the normal sub-pixels.

3. The display apparatus of claim 2, wherein the memory comprises a removable non-volatile memory and stores a value less than a minimum value among the luminance values of the plurality of sub-pixels, as luminance correction information of the defective sub-pixel, and
wherein the processor is further configured to limit an electric signal transmitted to the defective sub-pixel on the luminance correction information of the defective sub-pixel.

4. The display apparatus of claim 3, wherein the memory stores the luminance correction information of the defective sub-pixel as 0 (zero), and wherein the processor is further configured to limit an electric signal transmitted to the defective sub-pixel to 0 (zero), based on the luminance correction information of the defective sub-pixel.

5. The display apparatus of claim 1, further comprising:

a communication circuitry configured to communicate with a server, wherein the processor is further configured to receive the location information of the defective sub-pixel as inspected by an inspection apparatus and through the communication circuitry.

6. The display apparatus of claim 1, wherein the processor is further configured to detect a voltage value applied to each of the plurality of sub-pixels, is further configured to recognize a value less than or equal to a reference voltage value from the voltage value for each of the plurality of sub-pixels, and is further configured to recognize a sub-pixel, to which the recognized value is applied, as the defective sub-pixel.

7. The display apparatus of claim 1, wherein the display panel comprises a self-luminous light emitting diode (LED) display panel, and wherein the defective sub-pixel comprises a sub-pixel that is open in terms of an electrical circuit.

8. An inspection apparatus comprising:

a memory;

an image sensor configured to obtain a luminance image of a display apparatus, the display apparatus comprising a plurality of sub-pixels; and a processor configured to recognize a defective sub-pixel among the plurality of sub-pixels, based on the obtained luminance image, wherein the processor is further configured to recognize location information of the recognized defective sub-pixel, and is further configured to control the memory to store the recognized location information of the defective sub-pixel, wherein the memory is removably connected to at least one of the display apparatus and the processor, wherein the location information, stored in the memory and of the defective sub-pixel, comprises information indicating to limit an electric signal, applied to the defective sub-pixel of the display apparatus, wherein the memory stores normal location information and normal luminance correction information for each of normal sub-pixels among the plurality of sub-pixels, and the normal luminance correction information for each of the normal sub-pixels comprises information corresponding to an average value of luminance values of the plurality of sub-pixels and a luminance value for each of the normal sub-pixels.

9. The inspection apparatus of claim 8, wherein the processor is further configured to obtain luminance values, of each of the plurality of sub-pixels, based on the obtained luminance image, is further configured to recognize a luminance value, of the luminance values, as less than or equal to a reference luminance value among the obtained luminance value of each sub-pixel, and is further configured to recognize a sub-pixel, of the plurality of sub-pixels, having the recognized luminance value as the defective sub-pixel; and the processor is further configured to recognize another sub-pixel, of the plurality of sub-pixels, having a normal luminance value greater than the reference luminance value among the obtained luminance values of each of the plurality of sub-pixels, as the normal sub-pixel.

10. The inspection apparatus of claim 8, wherein the processor is further configured to store a luminance correction value of the recognized defective sub-pixel as 0 (zero) in the memory.

11. The inspection apparatus of claim 8, further comprising:

a communication circuitry configured to communicate with the display apparatus, wherein the processor is further configured to transmit the location information of the recognized defective sub-pixel to a display panel of the display apparatus through the communication circuitry.

12. The inspection apparatus of claim 8, further comprising:

a display portion, wherein the processor is further configured to recognize a number of defective sub-pixels, including the defective sub-pixel and of the plurality of sub-pixels, and is further configured to control the display portion to, based on the recognized number of defective sub-pixels being greater than or equal to a reference number, display the recognized number of defective sub-pixels and location information of the defective sub-pixel.

13. A control method of an inspection apparatus, the control method comprising:

obtaining a luminance image of a display panel comprising a plurality of sub-pixels;

obtaining luminance values for each of the plurality of sub-pixels based on the obtained luminance image;

recognizing a luminance value, of the luminance values, as less than or equal to a reference luminance value among the obtained luminance values for each of the plurality of sub-pixels;

recognizing a sub-pixel of the plurality of sub-pixels, having the recognized luminance value as a defective sub-pixel;

recognizing location information of the recognized defective sub-pixel;

storing the recognized location information of the defective sub-pixel in a memory; and storing normal location information and normal luminance correction information for each of normal sub-pixels among the plurality of sub-pixels, and wherein the normal luminance correction information for each of the normal sub-pixels comprises information corresponding to an average value of luminance values of the plurality of sub-pixels and a luminance value for each of the normal sub-pixels.

14. The control method of the inspection apparatus of claim 13, further comprising:

recognizing a sub-pixel, of the plurality of sub-pixels, having a luminance value, of the luminance values, greater than the reference luminance value among the obtained luminance values for each sub-pixel, as a normal sub-pixel.

15. The control method of the inspection apparatus of claim 13, further comprising:

transmitting location information of the recognized defective sub-pixel to a display apparatus through a communication circuitry;

recognizing a number of recognized defective sub-pixels; and displaying the recognized number of defective sub-pixels and location information of the defective sub-pixel through a display portion and based on the recognized number of defective sub-pixels being greater than or equal to a reference number.

\* \* \* \* \*